United States Patent

Ohnishi et al.

[11] 3,938,164
[45] Feb. 10, 1976

[54] DEVICE FOR THERMALLY RECORDING A CATHODE-RAY TUBE IMAGE

[75] Inventors: Masahiro Ohnishi; Yoshihiko Okamoto; Takahiro Ohta, all of Asaka, Japan

[73] Assignee: Fuji Photo Film Co., Ltd., Kanagawa, Japan

[22] Filed: Aug. 29, 1974

[21] Appl. No.: 501,578

[30] Foreign Application Priority Data
Aug. 29, 1973  Japan.............................. 48-97053

[52] U.S. Cl. ..... 346/110 R; 178/6.7 R; 346/74 CR; 355/83; 355/35
[51] Int. Cl.² ................. G01D 15/10; G03B 27/72
[58] Field of Search........ 346/74 CR, 74 ES, 74 EB, 346/74 J, 110 R, 25, 24; 354/299, 89–93; 355/14, 20, 83, 35; 178/6.6 A, 6.7 R, 7.4

[56] References Cited
UNITED STATES PATENTS

| | | | |
|---|---|---|---|
| 2,965,434 | 12/1960 | Downs | 346/110 R |
| 3,224,355 | 12/1965 | Thomiszer | 346/25 |
| 3,308,234 | 3/1967 | Bean | 346/110 R |
| 3,700,323 | 10/1972 | Guyette | 355/14 |
| 3,781,902 | 12/1973 | Shim | 346/24 |

Primary Examiner—Bernard Konick
Assistant Examiner—Jay P. Lucas
Attorney, Agent, or Firm—Sughrue, Rothwell, Mion, Zinn & Macpeak

[57] ABSTRACT

A device for recording a cathode-ray tube image comprising means for detecting temperatures of a thermal developing device and means for controlling either brightness of the cathode-ray tube or light emission time or a combination thereof. The change in developing temperature may be corrected by electrical means. The device provides prints of uniform density.

4 Claims, 5 Drawing Figures

DEVICE FOR THERMALLY RECORDING A CATHODE-RAY TUBE IMAGE

BACKGROUND OF THE INVENTION

1. Field of the Invention

This invention relates to a device for recording an image appearing on a cathode-ray tube on a sheet of a thermally developable photosensitive element always in a preferable density.

2. Description of the Prior Art

A thermally developable photosensitive element is a photosensitive element which is developed by heating at a temperature, for example, in excess of 100°C after the image exposure has been effected by light. One such element is produced by Minnesota Mining and Mfg. Co., U.S.A. and is commercially available under the trade mark "DRY SILVER."

The density of the image on the thermally developable photosensitive element after development changes with the change in developing temperature to such an extent that even with a minor change in temperature of only about 1°C the final print density is greatly affected. In an effort to obtain prints having a proper density, it is extremely difficult to design a thermal development station so that the developing device can always be maintained at a constant temperature. Generally, a thermostat is utilized to turn on or off the heater current, or the a.c. current for the heater is controlled by means of thyristors, etc., depending on the temperature so as to maintain the developing temperature constant. However, this tends to be affected by fluctuations in the voltage of the power supply or by ambient air conditions, and in addition, the developing temperature will change when a great number of prints are attempted to be obtained continuously. Furthermore, the thermal control response is late. If the thermal development is carried out by such a device as described, the print density varies, and thus prints of good quality are not obtained.

SUMMARY OF THE INVENTION

The present invention overcomes the disadvantages noted above and provides a device for recording an image appearing on a cathode-ray tube which provides prints whose density is always constant and whose quality is good.

This invention provides a device for recording a cathode-ray tube image on a thermally developable recording medium comprising:
means for generating a cathode-ray tube image;
means for supplying a thermally developable recording medium so as to expose the thermally developable recording medium to the image of the cathode-ray tube; and
means for thermally developing the exposed thermally developable recording medium; and including
means for detecting the temperature of the thermal developing means to convert the detected temperature into an electrical signal; and
means responsive to the electrical signal the degree of exposure of the thermally developable recording medium to the image of the cathode-ray tube.

The advantages of the device of the present invention will become apparent from the following description of the preferred embodiments taken in conjunction with the following drawings.

DESCRIPTION OF PREFERRED EMBODIMENTS

Figure 1:
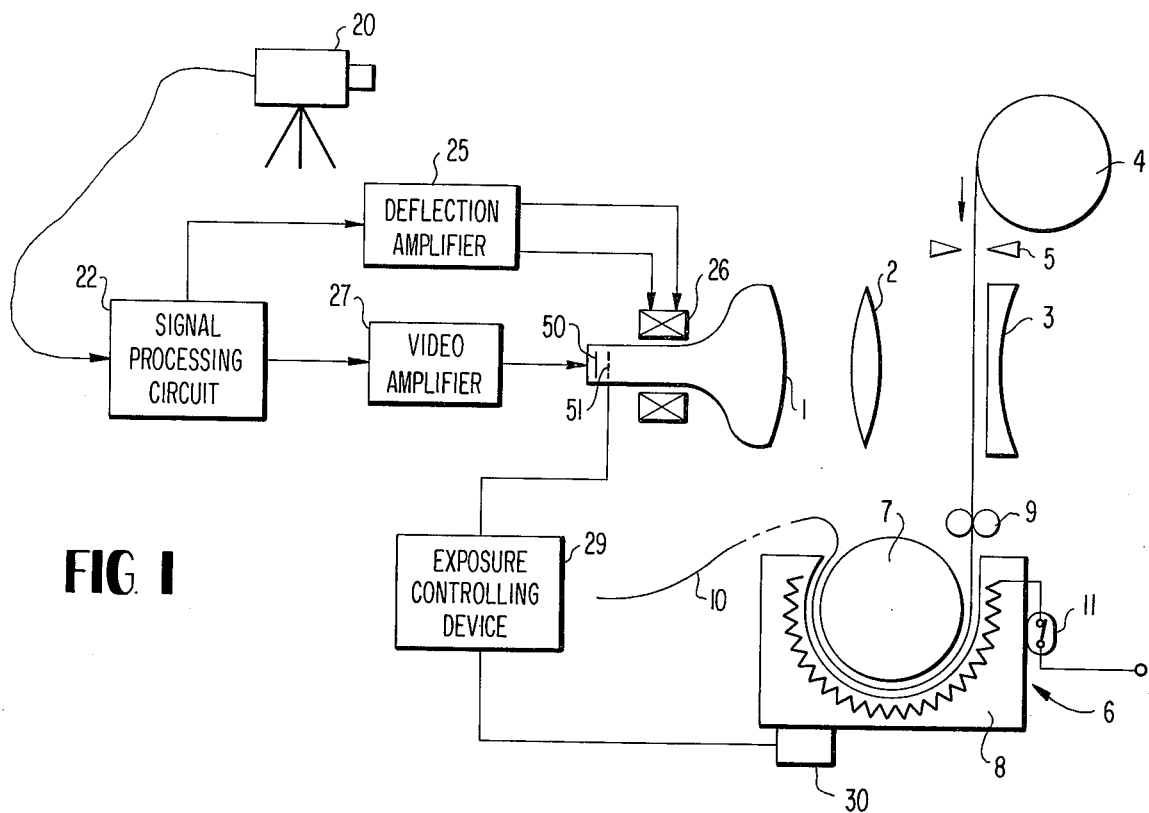
FIG. 1 is a block diagram of a device for recording an image appearing on a cathode-ray tube according to the invention.

Turning now to FIG. 1, a video signal from a video signal generator 20 from a television camera, etc., enters a video signal processing circuit 22 in a cathode-ray tube printer, which signal is separated into a synchronous signal and a video signal. The synchronous signal passes through a deflection amplifier 25 into a deflection yoke 26 to sweep electron beams. The video signal is amplified by means of a video amplifier 27 and then applied to a cathode 50 of a cathode-ray tube 1. A fluorescent image on the cathode-ray tube 1 is formed on the surface of a back plate 3 by means of a lens 2.

A sheet of thermally developable photosensitive element 4 (for example, as disclosed in U.S. Pat. Nos. 3,152,904 and 3,457,075) long in size is introduced onto the back plate 3, the photosensitive element being exposed by a predetermined amount of exposure by means of an exposure controlling device 29 in the cathode-ray tube. The thermally developable photosensitive element 4 thus exposed is cut by a cutter 5 into a suitable length and introduced into a thermal developing device 6 by means of guide rollers 9. Rotation of a drum 7 within the thermal developing device 6 feeds a sheet of the thermally developable photosensitive element, which is brought in contact with a heating station 8 surrounding the drum 7 to heat the thermally developable photosensitive element to a predetermined temperature. The surface of drum 7 is made of a material with a high coefficient of friction, and the surface of heating station 8 is finished to have a smooth surface with a small coefficient of friction. A final print 10 is delivered from the heating station 8. The temperature of the heating station 8 of the thermal developing device is controlled by a thermostat 11. In the construction as described above, fast and fine temperature control may not be accomplished by the thermostat 11, thus prints of high quality are not obtained.

The improvement of the device according to the present invention is as follows.

In the device according to the invention, the amount of exposure can be controlled by controlling the brightness of the cathode-ray tube or the exposure time, or by a combination thereof. The amount of exposure can be controlled by means of an exposure controlling device 29, which is illustrated in detail in FIG. 2.

In this exposure controlling device, when the thermally developable photosensitive element 4 is not being exposed, a voltage applied to a grid 51 is held at a level less than an erasing voltage of the brightness point so as to avoid glow of the fluorescent surface of the cathode-ray tube 1. For this purpose, a contact strip 40 is placed in contact with a contact 41 in FIG. 2. At the moment when a copy button 43 is depressed, a relay 34 activates to transfer the position of the contact strip 40 to contact of a contact 42, and the voltage of the grid 51 increases to a level higher than the brightness point erasing voltage and the fluorescent surface of the cathode-ray tube begins to glow. Thereafter, after the lapse of a set time of a timer 44, which comprises a relay 34, a resistor 35 and a capacitor 36, the relay 34 operates to return the contact strip 40 to the contact 41 thus avoiding again a glow of the fluorescent surface. The contact 37 is held by the relay 34.

The heating station 8 is intimately provided with a temperature detector 30 such as a thermistor, as illustrated in FIG. 1. In the grid circuit shown in FIG. 2, the temperature detector 30 is connected in series to a resistor 45, and the contact 42 is connected between the temperature detector 30 and the resistor. Since the thermistor increases in resistance as the detection temperature decreases, the grid voltage increases to thereby increase the brightness of the fluorescent surface of the cathode-ray tube and to increase the amount of exposure onto the thermally developable photosensitive element. Conversely, when the temperature detected by the thermistor increases, that is, when the heating temperature of the thermally developable photosensitive element in the heating station 8 of the thermal developing device increases, the amount of exposure onto the thermally developable photosensitive element decreases.

Figure 3:
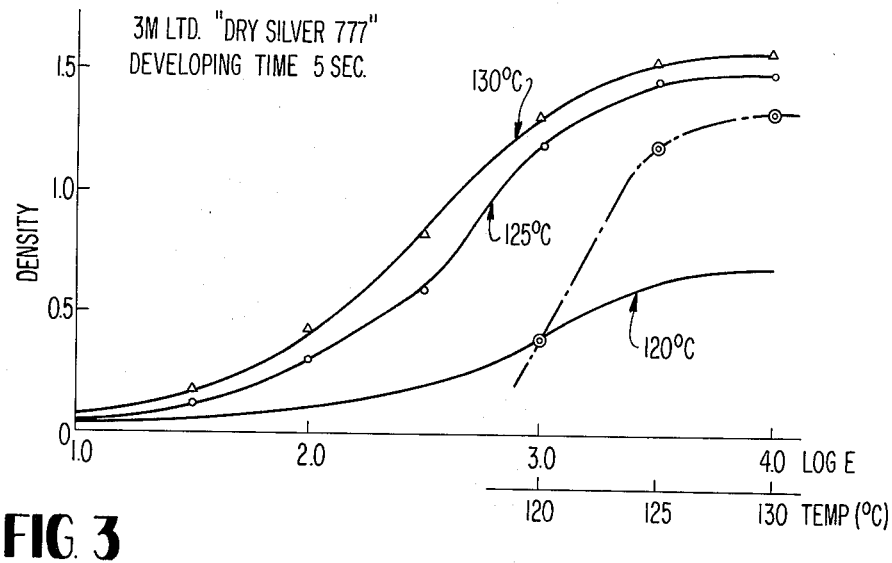
FIG. 3 is a graphic representation illustrating the relationship between the developing temperature, the amount of exposure and the print density.

FIG. 3 gives the relationship between the change in developing temperature, in case of a predetermined amount of exposure (log E = 3.0), and the density of the print, and the relationship between the density of the print on the thermally developable photosensitive element (specifically in this case for 3 M Ltd. DRY SILVER TYPE "777") at respective temperatures with the developing temperature varied and the amount of exposure. From the graph in FIG. 3, it will be apparent that when the developing temperature decreases, the density of the print decreases considerably, but that this decrease can be compensated for by increasing the amount of exposure to thus maintain always a proper print density. Since the relationship between the change in developing temperature and the density of the print can be considered to approach a simple quadratic function, compensation therefor is easy.

The change in the developing temperature in the thermal developing device cannot be avoided in terms of a temperature controlling mechanism, and even if the range of change thereof is reduced, the change in temperature produced by introduction of the thermally developable photosensitive element into the heating station maintained at a constant temperature cannot be eliminated. As previously described, the density of the print of the thermally developable photosensitive element is affected by such a small change in temperature.

Figure 4A:
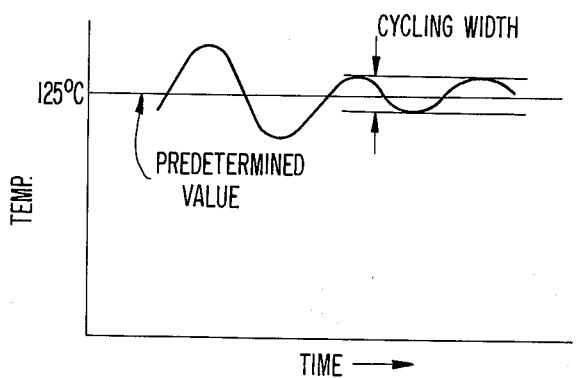
FIG. 4, consisting of 4a and 4b, is a graphic representation illustrating the change in temperature of the thermal developing device.
Figure 4B:
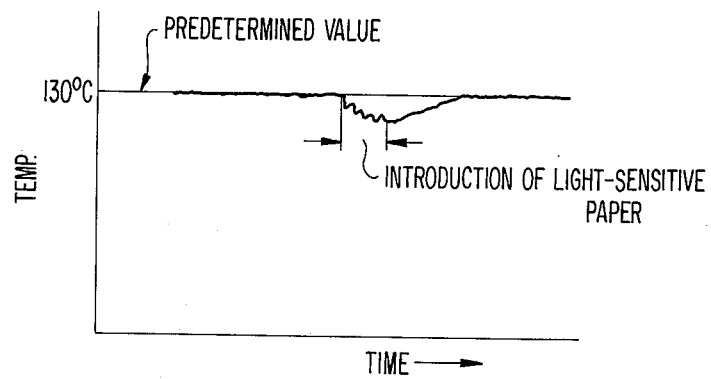

FIG. 4 (a), for example, gives a curve of the temperature characteristics with respect to the time obtained when temperature control is effected using a thermostat. In this curve, cycling is produced in a range of from 4° to 5°C above and below a set temperature of 125°C. The period thereof greatly differs depending upon the thermal capacity of the thermal developing device, but is in the range of from 10 seconds to one minute. On the other hand, FIG. 4 (b) gives the relationship obtained when the heater current in the heating station is controlled by use of a thyristor. Here, the heating temperature does not significantly change, but a temperature decrease of approximately 5°C is produced every time the thermally developable photosensitive element is introduced into the thermal developing device, requiring from 10 to 30 seconds until the temperature returns to the set temperature (130°C).

As described above, the change in the developing temperature cannot be avoided in the thermal developing device. According to the present invention, the fluctuation of the print density produced by the change in developing temperature is corrected by varying the amount of exposure by the cathode-ray tube.

Figure 2:
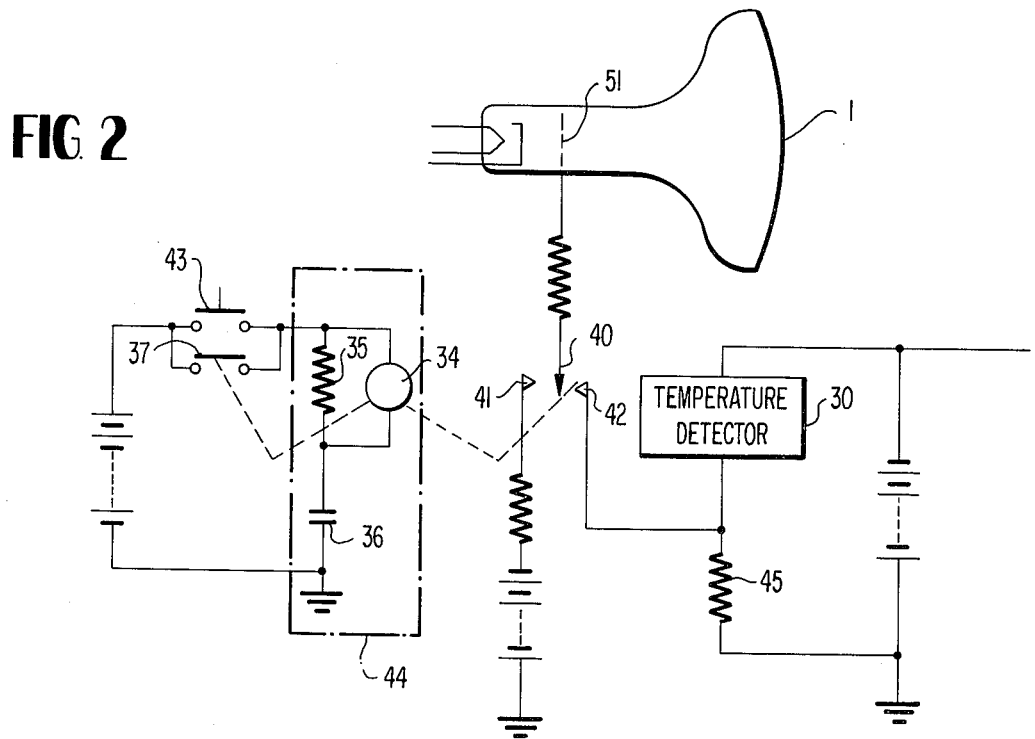
FIG. 2 is a circuit diagram showing one example wherein the brightness of the fluorescent screen of the cathode-ray tube can be varied.

While examples, in which correction is made by varying the brightness of the fluorescent surface of the cathode-ray tube, have been described in preferred embodiments as explained with reference to FIGS. 1 and 2, the amount of exposure can also be changed by varying the exposure time instead of controlling the brightness. For example, in FIG. 2, the temperature detector 30 can be connected in series to the resistor 35, which constitutes the timer 44, instead of connecting the temperature detector to the grid circuit, so as to complete a time constant circuit with the capacitor 36. With this construction, the exposure time can be decreased when the developing temperature increases, while the exposure time can be increased when the developing temperature decreases. In addition, alternative heating devices can be employed. For example, a transparent drum 1 as shown in FIG. 2 containing therein infrared heating elements can be employed or alternatively a transparent drum containing infrared heating elements as described can be employed with a reflecting plate to heat the thermally developable recording medium as disclosed in Japanese Patent Publications Nos. 9375/1974 and 8340/1974.

Further, the change in print density due to the change in temperature of the heating device can be corrected by not only merely controlling the exposure time but also by varying the width of the raster of the cathode-ray tube with the aid of the detection temperature to change the apparent density. In this case, an arrangement should be made so that the brightness is not affected by the width of the raster.

From the above, the device of the present invention provides quick responsive electrical means to correct for changes in developing temperature, whereby prints of uniform density can be obtained in a thermal developing recorder for use with a cathode-ray tube.

While the invention has been described in detail and with reference to specific embodiments thereof, it will be apparent to one skilled in the art that various changes and modifications can be made therein without departing from the spirit and scope thereof.

What is claimed is:

1. A device for recording a cathode-ray tube image on a thermally developable recording medium comprising:

means for generating a cathode-ray tube image;

means for supplying a thermally developable recording medium so as to expose said thermally developable recording medium to the image of said cathode-ray tube; and means for thermally developing said exposed thermally developable recording medium; and including means for detecting the temperature of the thermal developing means to convert the detected temperature into an electrical signal; and means responsive to said electrical signal for controlling the degree of exposure of said thermally developable recording medium to the image of said cathode-ray tube.

2. The device for recording a cathode-ray tube image of claim 1, wherein said means for controlling the degree of exposure comprises means for controlling the brightness of the cathode-ray tube image.

3. The device for recording a cathode-ray tube image of claim 1, wherein said means for controlling the degree of exposure comprises means for controlling the light emission time of said cathode-ray tube image.

4. The device for recording a cathode-ray tube image of claim 1, wherein said means for controlling the degree of exposure comprises means for controlling both the brightness of the cathode-ray tube image and the light emission time of said cathode-ray tube image.

* * * * *